(12) United States Patent
Heo

(10) Patent No.: US 11,581,596 B2
(45) Date of Patent: Feb. 14, 2023

(54) COOLING BLOCK FOR A BATTERY MODULE AND A MANUFACTURING METHOD THEREOF

(71) Applicants: HYUNDAI MOTOR COMPANY, Seoul (KR); KIA CORPORATION, Seoul (KR)

(72) Inventor: Sug Won Heo, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/546,924

(22) Filed: Dec. 9, 2021

(65) Prior Publication Data

US 2022/0102778 A1 Mar. 31, 2022

Related U.S. Application Data

(62) Division of application No. 16/659,142, filed on Oct. 21, 2019, now abandoned.

(30) Foreign Application Priority Data

Jun. 10, 2019 (KR) .................. 10-2019-0067777

(51) Int. Cl.
 *H01M 10/6556* (2014.01)
 *H01M 10/625* (2014.01)
 *H01M 10/613* (2014.01)
(52) U.S. Cl.
 CPC ..... *H01M 10/6556* (2015.04); *H01M 10/613* (2015.04); *H01M 10/625* (2015.04); *H01M 2220/20* (2013.01)

(58) Field of Classification Search
 CPC .......... H01M 10/6556; H01M 10/613; H01M 10/625; H01M 2220/20; H01M 10/653;
 (Continued)

(56) References Cited

U.S. PATENT DOCUMENTS 9,440,523 B2 * 9/2016 Decker ................. H01M 50/20
2014/0287292 A1 9/2014 Baumgart et al.
(Continued)

FOREIGN PATENT DOCUMENTS

CN 202543048 U * 11/2012
CN 109411656 A * 3/2019 .......... H01M 10/625
(Continued)

*Primary Examiner* — Len Tran
*Assistant Examiner* — Gustavo A Hincapie Serna
(74) *Attorney, Agent, or Firm* — Lempia Summerfield Katz LLC

(57) ABSTRACT

A method of manufacturing a cooling block for a battery module includes preparing a first cooling block and a second cooling block. The first cooling block is configured to be in contact with battery modules on a first side thereof. The second cooling block is configured to be bonded to a second side of the first cooling block and forms a cooling channel, through which cooling water can flow, at an interface with the second side of the first cooling block. The second cooling block is disposed and fixed on the second side of the prepared first cooling block with a jig. The fixed first cooling block and second cooling block are bonded by heating and welding the first and second cooling blocks. Only the second cooling block is selectively quenched.

6 Claims, 3 Drawing Sheets

(58) Field of Classification Search
CPC ......... H01M 10/6554; H01M 10/6568; H01M 10/6567; Y02E 60/10
See application file for complete search history.

(56) References Cited

U.S. PATENT DOCUMENTS

| | | | | |
|---|---|---|---|---|
| 2015/0079442 | A1* | 3/2015 | Haussmann | H01M 10/625 |
| | | | | 429/120 |
| 2015/0086831 | A1* | 3/2015 | Haussmann | H01M 10/625 |
| | | | | 429/120 |
| 2015/0197039 | A1* | 7/2015 | Matsuzuki | C03B 11/125 |
| | | | | 264/297.7 |
| 2016/0049705 | A1* | 2/2016 | Mahe | F28F 3/10 |
| | | | | 29/890.03 |
| 2016/0204486 | A1* | 7/2016 | Kenney | H01M 10/6568 |
| | | | | 29/890.03 |
| 2017/0004983 | A1* | 1/2017 | Madigan | H01L 21/67393 |
| 2018/0048039 | A1* | 2/2018 | Newman | H01M 10/625 |
| 2018/0287227 | A1* | 10/2018 | Jeong | B60L 50/66 |
| 2018/0304390 | A1* | 10/2018 | Hirayama | B23K 35/28 |
| 2019/0115641 | A1* | 4/2019 | Kopp | H01M 10/6568 |
| 2019/0221905 | A1 | 7/2019 | Shimizu | |
| 2019/0356028 | A1* | 11/2019 | Cassard | H01M 10/625 |
| 2020/0227794 | A1 | 7/2020 | Mazza et al. | |
| 2020/0381790 | A1* | 12/2020 | Kang | H01M 10/613 |
| 2021/0226279 | A1 | 7/2021 | Fröhlich et al. | |

FOREIGN PATENT DOCUMENTS

| | | | | |
|---|---|---|---|---|
| CN | 209497786 | U * | 10/2019 | |
| KR | 20180130716 | A * | 12/2018 | .......... H01M 10/613 |
| KR | 101960784 | B1 | 3/2019 | |
| WO | WO-2019225846 | A1 * | 11/2019 | .......... H01M 10/613 |

* cited by examiner

- PRIOR ART -

– PRIOR ART –

COOLING BLOCK FOR A BATTERY MODULE AND A MANUFACTURING METHOD THEREOF

CROSS-REFERENCE TO RELATED APPLICATION

This application claims priority to and is a division of co-pending U.S. patent application Ser. No. 16/659,142 entitled "COOLING BLOCK FOR A BATTERY MODULE AND A MANUFACTURING METHOD THEREOF", filed Oct. 21, 2019, which claims priority to and the benefit of Korean Patent Application No. 10-2019-0067777, filed on Jun. 10, 2019 in the Korean Intellectual Property Office. The entire contents of these prior filed applications are incorporated herein by reference.

BACKGROUND

1. Field of the Disclosure

The present disclosure relates to a cooling block for a battery module and a manufacturing method thereof and, more particularly, to a cooling block for a battery module and a method of manufacturing the cooling block, the cooling block providing different thermal conductivity and strength for each region by performing selective cooling for each region.

2. Description of the Prior Art

Recently, the technology of increasing the fuel or energy efficiency of vehicles that use electrical energy as a power source has been developed. With an increase in the demand for hybrid electric vehicles (HEV) and electric vehicles (EV), and for the above-mentioned purpose, research for increasing the capacity of batteries is continuously progressing.

Together with the demand for increasing the capacity of batteries, technology for dissipating heat that is generated by batteries during the use of the batteries has also been studied.

Methods of cooling a battery in a vehicle that uses electrical energy as a power source are broadly classified into an air-cooling type and a water-cooling type.

Meanwhile, recently, as the capacity of batteries is increased to increase fuel efficiency, more heat is generated. The air-cooling type coolers provide limited heat dissipation. Thus, air-cooling type coolers are being replaced with water-cooling type coolers, the cooling efficiency of which is relatively high.

A water-cooling type cooler that cools a battery includes a cooling block having cooling channels through which cooling water flows. Such a cooling block is manufactured by forming a top plate and a bottom plate and then bonding the plates to form cooling channels through which cooling water flows.

FIG. 1 is an exploded perspective view showing a common cooling block for a battery module and FIG. 2 is a cross-sectional view of the common cooling block for a battery module. The common cooling block for a battery module of the related art includes a first cooling block 10 being in contact with battery modules 1 on a first side and a second cooling block 20 bonded to a second side of the first cooling block 10 and forming a cooling channel 21. Cooling water flows through the cooling channel 21 at the interface with the second side of the first cooling block 10.

The cooling block for a battery module has to be able to readily remove the heat that is generated from the battery modules 1 using the flow of cooling water. Thus, it is usually manufactured using aluminum or an aluminum alloy having high thermal conductivity. Further, the first cooling block 10 and the second cooling block 20 are bonded by brazing, which has high reliability in bonding in order to prevent the cooling water from leaking outside the cooling block.

There is a possibility of leakage of the cooling water in the water-cooling type cooling block, as shown in FIG. 1. Thus, the first cooling block 10 is formed in a wide flat plate shape so that: all of the battery modules 1 can be in contact with the first cooling block 10; all of the battery modules 1 are seated on the first side; and the second cooling block 20 having the cooling channel 21 through which the cooling water flows is bonded to the second side.

Accordingly, under the tendency of increasing the size of cooling modules with an increase in the capacity of batteries, it is also required to reduce the thickness in order to decrease the weight and improve the cooling performance.

On the other hand, aluminum-silicon or Al—Si-based 4xxx series alloys are generally used as the filter metal of brazing for bonding the first cooling block 10 and the second cooling block 20. Al—Si-based filter metals are most generally used because they have lower melting points than base materials and have high affinity with base materials.

However, when the first cooling block 10 and the second cooling block 20 are bonded by brazing, it is required to heat a base material to melt the filter metal. But in this process, the base material is also heated to a temperature close to the melting point because a filter metal of a series similar to that of the base material is used. Accordingly, when a base material that has undergone heat treatment to improve properties is bonded by brazing, it is difficult to keep the property improvement effect due to the temperature to which the base material is heated. Accordingly, for brazed products, heat treatment is applied to products bonded after brazing.

However, it is required to increase the contact area with battery modules, which are heat generating bodies, and reduce the thickness for cooling efficiency in cooling blocks for battery modules. As a result, the cooling blocks are formed in a shape that is substantially wide and thin. However, there is a problem in that when heat treatment is applied to cooling blocks with this shape, deformation is caused by temperature differences in a product.

The description provided above as a related art of the present disclosure is only to help understand the background of the present disclosure and should not be construed as being included in the related art known by those having ordinary skill in the art.

SUMMARY

The present disclosure provides a cooling block for a battery module and a method of manufacturing the cooling block. The cooling block is made of a same metal-based material but provides different thermal conductivity and strength for each region by partially controlling cooling.

A cooling block for a battery module according to an embodiment of the present disclosure includes a first cooling block being in contact with battery modules on a first side and a second cooling block bonded to a second side of the first cooling block and forming a cooling channel. Cooling water flows through the cooling channel at an interface with the second side of the first cooling block. The first cooling block and the second cooling block are made of a same metal-based material. Thermal conductivity and strength of the first cooling block are different from thermal conductivity and strength of the second cooling block.

The thermal conductivity of the first cooling block is higher than the thermal conductivity of the second cooling block.

The strength of the second cooling block is greater than the strength of the first cooling block.

The first cooling block and the second cooling block are made of an aluminum-based alloy.

The first cooling block and the second cooling block are welded and then only the second cooling block is partially quenched.

A method of manufacturing a cooling block for a battery module according to an embodiment of the present disclosure includes: a preparing step of preparing a first cooling block being in contact with battery modules on a first side thereof and a second cooling block bonded to a second side of the first cooling block and forming a cooling channel, through which cooling water flows, at an interface with the second side of the first cooling block; a fixing step of disposing and fixing the second cooling block on the second side of the prepared first cooling block with a jig; a bonding step of bonding the fixed first cooling block and second cooling block by heating and welding the first and second cooling blocks; and a cooling step of selectively quenching only the second cooling block from the heated first cooling block and second cooling block.

The preparing step prepares an aluminum-based alloy for the first cooling block and the second cooling block. The bonding step heats the first cooling block and the second cooling block over a solution treatment temperature of the aluminum-based alloy and then welds the first cooling block and the second cooling block.

The method further includes a post-heat treatment step that performs heat treatment by heating the first cooling block and the second cooling block after the cooling step.

The jig that is used in the fixing step is divided into a first jig and a second jig. The first jig supports a side that is opposite to a side facing the second cooling block of outer sides of the first cooling block. The second jig supports a side that is opposite to a side facing the first cooling block of outer sides of the second cooling block. The first jig is prepared in a shape corresponding to the side that is opposite to the side facing the second cooling block of the outer sides of the first cooling block and the second jig is prepared in a shape that covers and partially exposes the side that is opposite to the side facing the first cooling block of the outer sides of the second cooling block. The cooling step selectively quenches only the second cooling block by bringing cooling water or cooling oil in contact with an exposed area of the second cooling block that is exposed by the second jig.

A discharge part that discharges the cooling water or cooling oil is disposed around the second jig in the cooling step.

A third jig forms a cooling channel through which cooling water or cooling oil flows and covers the exposed area of the second cooling block. The third jig is further disposed and then only the second cooling block is selectively quenched by guiding cooling water or cooling oil to the cooling channel.

According to an embodiment of the present disclosure, the first cooling block, which is in contact with the battery modules, and the second cooling block, which forms a cooling channel, are bonded by brazing. Then only the second cooling block is quenched. Thus, there is an effect in that the first cooling block maintains relatively high thermal conductivity and the second cooling block maintains greater strength, thereby being able to improve properties.

Further, properties are improved through heat treatment, so it is possible to reduce the thickness of the entire cooling block. Accordingly, it is possible not only to reduce the weight, but also to improve cooling performance of the cooling block.

Further, since it is possible to apply heat treatment such as quenching immediately after bonding using a brazing furnace in which brazing is performed, it is possible to obtain an advantage in terms of the manufacturing costs. Further, since it is possible to selectively apply heat treatment only to a necessary area of the cooling block to which it has conventionally been difficult to perform heat treatment due to shape limitations, an effect of improving desired properties for each area can be expected.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EMBODIMENTS

Figure 1:
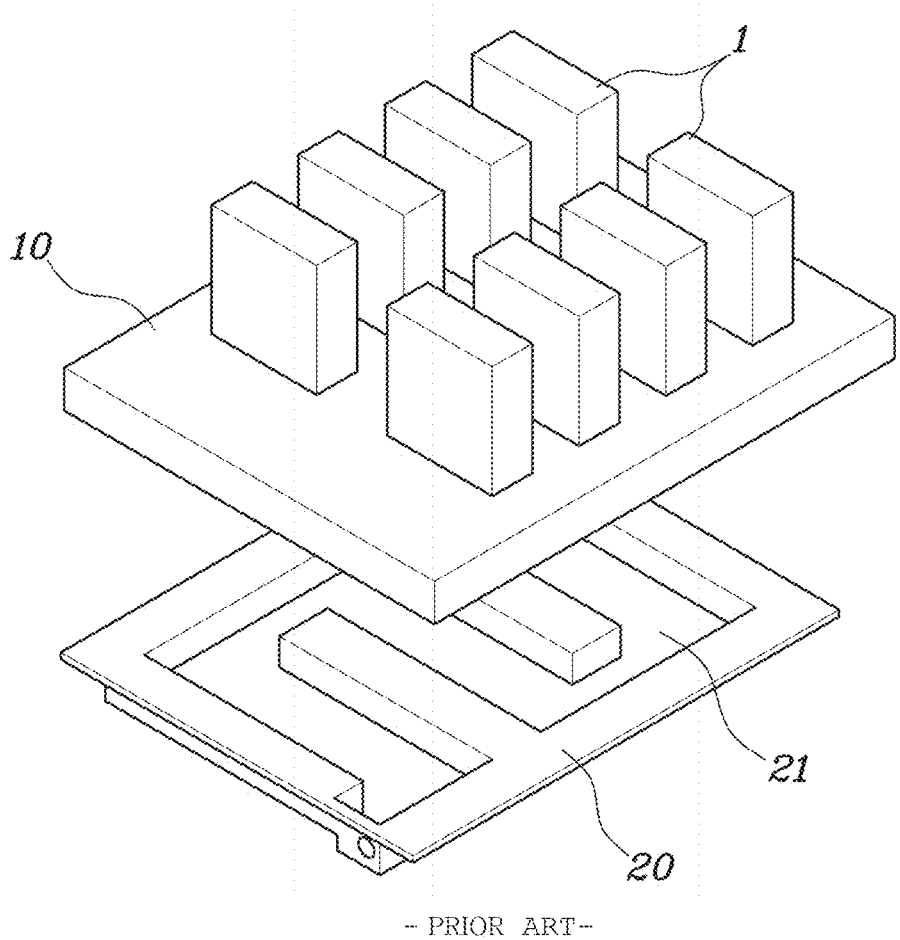
FIG. 1 is an exploded perspective view showing a common cooling block for a battery module.

Hereinafter, embodiments of the present disclosure are described in detail with reference to the accompanying drawings. However, the present disclosure is not limited to the following embodiments and can be implemented in various ways different from one another. The embodiments are provided to complete the present disclosure and to completely inform those having ordinary skill in art of the scope of the present disclosure. The same components are given the same reference number in the drawings.

Figure 2:
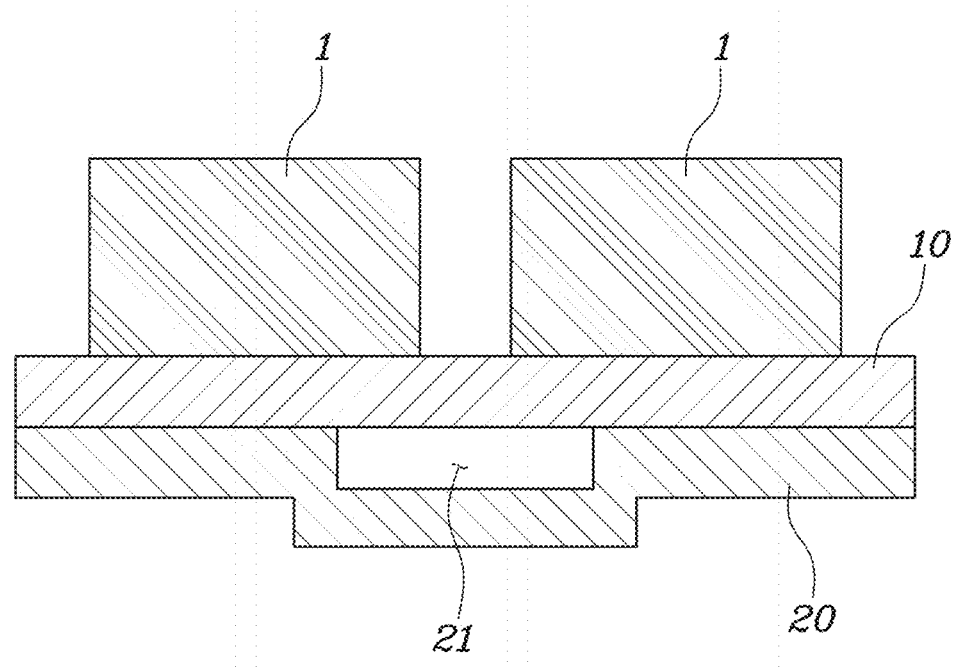
FIG. 2 is a cross-sectional view showing the common cooling block for a battery module.

FIG. 1 is an exploded perspective view showing a common cooling block for a battery module and FIG. 2 is a cross-sectional view showing the common cooling block for a battery module.

A cooling block for a battery module according to the present disclosure, similar to the cooling blocks for a battery module of the related art, as shown in FIG. 1, includes a first cooling block 10 being in contact with battery modules 1 on a first side and a second cooling block 20 bonded to a second side of the first cooling block 10 and forming a cooling channel 21. Cooling water flows through the cooling channel 21 at the interface with the second side of the first cooling block 10.

However, the cooling block for a battery module according to the present disclosure is characterized by being different than the common cooling block of FIG. 1. According to the disclosure, the first cooling block 10 and the second cooling block 20 are made of a same metal-based material but the thermal conductivity and strength of the first cooling block 10 are different from the thermal conductivity and strength of the second cooling block 20.

The first cooling block 10 is in contact with the battery modules, i.e., the heat generating bodies, on the first side and is in contact with cooling water on the second side, thereby dissipating heat that is generated from the battery modules 1.

The first cooling block 10 is formed in a wide plate shape so that all of the battery modules 1 can be in contact with the first cooling block 10 and so that all of the battery modules 1 are seated on the first side because there is a possibility of leakage of the cooling water. The first cooling block 10 is formed thicker than the second cooling block to support the battery modules 1 and to improve collision performance. The first cooling block 10 is not limited to a specific shape as long as all of the battery modules 1 can be in contact with the first side and the second cooling block 20 can be bonded to the second side. For example, as shown in the figures, although the first cooling block 10 may be formed in a flat plate shape, grooves for seating the battery modules 1 or protrusions surrounding the areas where the battery modules 1 are seated may be formed on the first side of the first cooling block 10. This is in order to seat the battery modules 1 in a stable posture and improve heat transfer efficiency by increasing the contact area between the battery modules 1 and the first cooling block 10. Further, grooves or protrusions may be formed on the second side of the first cooling block 10 to improve heat transfer efficiency by increasing the contact area between the first cooling block 10 and the cooling water. Further, the first cooling block 10 may be partially bent with the entire wide plate shape maintained to achieve the functions of the grooves and protrusions described above.

High thermal conductivity is required for the first cooling block 10 to dissipate heat from the battery modules 1. However, when heat treatment is applied, thermal conductivity may be deteriorated by the heat treatment.

The second cooling block 20 is bonded to the first cooling block 10, thereby providing a space in which the cooling water flows.

Accordingly, the second cooling block 20 has a cooling channel 21, which has a U-shaped cross-section. The cooling channel 21 is on the surface so that a space in which the cooling water flows is formed at the interface by being in contact with the second side of the first cooling block 10. Obviously, the cross-sectional shape of the cooling channel 21 is not limited to a U-shape and may be changed in various shapes that can form a space in which cooling water can flow. The second cooling block 20 is formed thinner than the first cooling block 10 to prevent the thickness of the entire layout of the cooling block from increasing and to reduce the material. However, the higher the strength, the more advantageous the second block 20 is in order to prevent deformation due to the pressure of the cooling water flowing through the cooling channel 21.

The first cooling block 10 and the second cooling block 20 are made of the same metal-based material to be bonded by welding, such as brazing. For example, the first cooling block 10 and the second cooling block 20 may be made of aluminum or an aluminum alloy having high thermal conductivity.

Although the first cooling block 10 and the second cooling block 20 are made of the same metal-based material, as described above, the first cooling block 10 may be higher in thermal conductivity than the second cooling block 20 and the second cooling block 20 may be higher in strength than the first cooling block 10, depending on the functions.

In general, the properties of heat treatment type aluminum alloys before and after heat treatment are as shown in the following Table 1.

TABLE 1

| Aluminum alloy | Temper | Yield strength (MPa) | Tensile strength (MPa) | Thermal conductivity (W/m · K) |
| --- | --- | --- | --- | --- |
| Al—Cu-base | O | 75 | 185 | 193 |
|  | T6 | 342 | 423 | 149 |
| Al—Mg—Si-base | O | 50 | 90 | 218 |
|  | T6 | 215 | 240 | 200 |
| Al—Zn-base | O | 102 | 226 | 171 |
|  | T6 | 505 | 570 | 130 |

As shown in Table 1, common heat treatment type aluminum alloys are improved in yield strength and tensile strength but are decreased in thermal conductivity when the temper is T6 (artificially aged) in which heat treatment has been performed in comparison to when the temper is O in which heat treatment has not been performed. The reason is because heat treatment of aluminum alloys improves strength by first making a supersaturated solid solution by rapidly cooling an aluminum alloy and forming unstable reinforcing particulates in aging (post-heat treatment). The reinforcing particulates act as a factor that improves strength but interfere with thermal conductivity.

The present disclosure uses the characteristic in which the properties of aluminum alloys are changed before and after heat treatment. According to the present disclosure, in order to give different thermal conductivity and strength to the first cooling block 10 and the second cooling block 20, the first cooling block 10 and the second cooling block 20 are heated and bonded by welding. However, then quenching is partially applied only to the second cooling block 20. Brazing may be used for the welding. The type of welding is not limited only to brazing and various types of welding that can bond the first cooling block 10 and the second cooling block 20 while heating them can be applied, depending on the shapes and the kinds of materials of the first cooling block 10 and the second cooling block 20.

A method of manufacturing the cooling block for a battery module having the configuration described above in accordance with an embodiment of the present disclosure is described with reference to the drawings.

Figure 3:
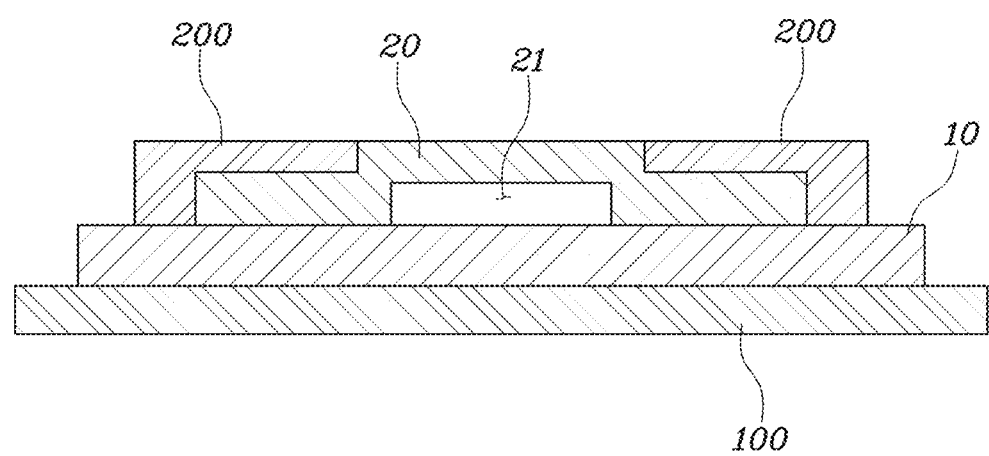
FIG. 3 is a view showing a state when a jig has been fastened to manufacture a cooling block for a battery module according to an embodiment of the present disclosure.
Figure 4:
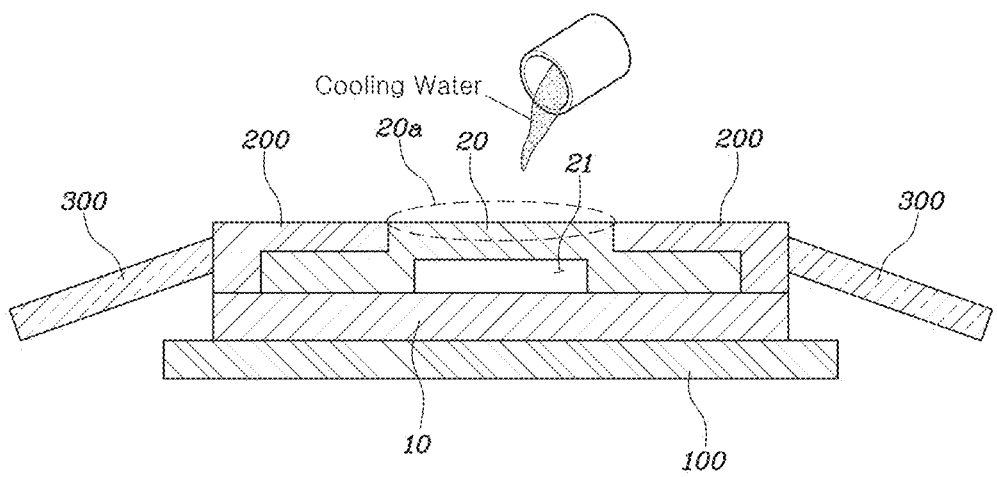
FIGS. 4 and 5 are views showing a state when a jig has been fastened to manufacture a cooling block for a battery module according to another embodiment of the present disclosure.
Figure 5:
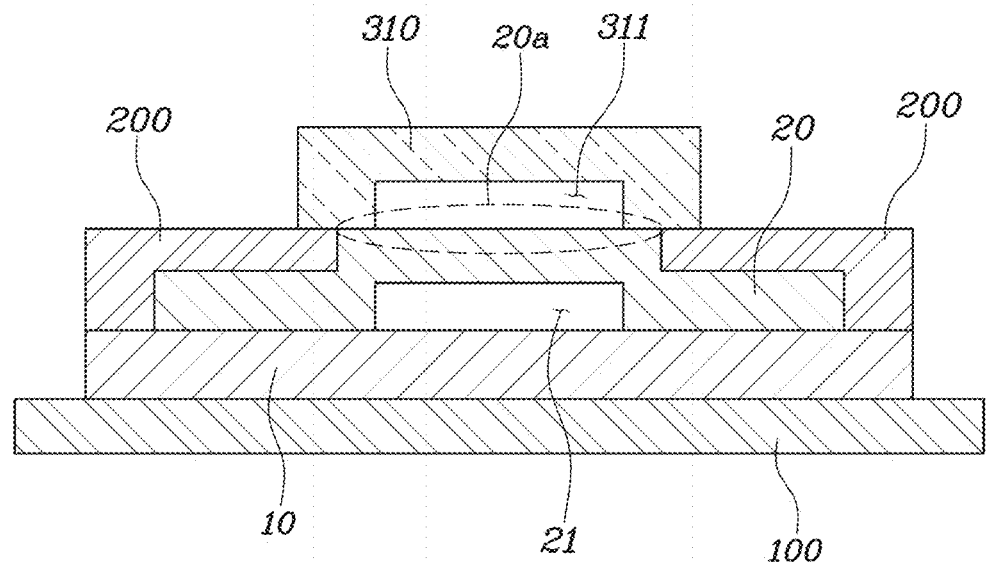

FIG. 3 is a view showing a state when a jig has been fastened to manufacture a cooling block for a battery module according to an embodiment of the present disclosure. FIGS. 4 and 5 are views showing a state when a jig has been fastened to manufacture a cooling block for a battery module according to another embodiment of the present disclosure.

A method of manufacturing a cooling block for a battery module according to an embodiment of the present disclosure includes a preparing step of preparing a first cooling block 10 being in contact with battery modules 1 on a first side and a second cooling block 20 bonded to a second side of the first cooling block 10 and forming a cooling channel 21, through which cooling water flows, at the interface with the second side of the first cooling block 10. The method includes a fixing step of disposing and fixing the second cooling block 20 on the second side of the prepared first cooling block 10 with a jig. The method includes a bonding step of bonding the fixed first cooling block 10 and the second cooling block 20 by heating and welding the first and second cooling blocks 10 and 20. The method includes a cooling step of selectively quenching only the second cooling block 20 from the first cooling block 10 and the second cooling block 20.

The method includes a post-heat treatment step of performing heat treatment by heating the first cooling block 10 and the second cooling block 20 after the cooling step.

The preparing step, which is a step of preparing the first cooling block 10 and the second cooling block 20 that constitute the cooling block, prepares the same aluminum alloy for the first cooling block 10 and the second cooling block 20. A heat treatment type aluminum alloy, of which the yield strength and the tensile strength are improved by heat treatment, may be prepared for the first cooling block 10 and the second cooling block 20. For example, it may be possible to manufacture the first cooling block 10 and the second cooling block 20 using the Al—Cu-based, Al—Mg—Si-based, and Al—Zn-based aluminums. The first cooling block 10 and the second cooling block 20 may be manufactured using any one aluminum alloy selected from the proposed Al—Cu-based, Al—Mg—Si-based, and Al—Zn-based aluminums, or may be manufactured by using an aluminum alloy selected from the Al—Cu-based, Al—Mg—Si-based, and Al—Zn-based aluminums in different ways.

The fixing step, which is a step of disposing and fixing the second cooling block 20 on the second side of the first cooling block 10 in order to bond the prepared first cooling block 10 and second cooling block 20 through brazing, fixes the cooling blocks using a jig.

The jig that is used in this step is divided into a first jig 100 and a second jig 200. The first jig 100 supports a side of the first cooling block 10 that is opposite to the side facing the second cooling block 20 of the outer sides of the first cooling block 10. The second jig 200 supports a side of the second cooling block 20 that is opposite to the side facing the first cooling block 10 of the outer sides of the second cooling block 20.

The first jig 100 is prepared in a plate shape to prevent twisting deformation of the first cooling block 10 to be able to cover the entire first side of the first cooling block 10, thereby supporting the first cooling block 10.

The second jig 200 is prepared to cover and partially expose the side that is opposite to the side facing the first cooling block 10 of the outer sides of the second cooling block 20. The second jig 200 may be divided into several parts to form the area 20a (hereafter, referred to as an 'exposed area') that is exposed of the outer sides of the second cooling block 20. The exposed area 20a formed by the second jig 200 is an area with which cooling water or cooling oil, which is a cooling medium, comes in direct contact in the following cooling step.

Accordingly, the first jig 100 prevents deformation of the first cooling block 10 and the second cooling block 20. The second jig 200 fixes the first cooling block 10 and the second cooling block 20 while forming the exposed area 20a.

The bonding step, which is a step of bonding the first cooling block 10 and the second cooling block 20 by heating them through brazing, puts the first cooling block 10 and the second cooling block 20, which are fixed by the first jig 100 and the second jig 200, into a brazing furnace and then heats them therein. The aluminum alloy for manufacturing the first cooling block 10 and the second cooling block 20 is heated to above a solution treatment temperature. For example, the first cooling block 10 and the second cooling block 20 are heated at a level of 600° C.±20° C. (1,110° F.±36° F.)

After being sufficiently heated, the first cooling block 10 and the second cooling block 20 are bonded through brazing.

The cooling step selectively or partially quenches only the second cooling block of the first cooling block 10 and the second cooling block 20 that have been heated in the bonding step. Only the second cooling block 20 is selectively or partially quenched by bringing cooling water or cooling oil into contact with the exposed area 20a of the second cooling block 20 formed by the second jig 200.

The cooling step may be performed in the brazing furnace where the bonding step is performed or may be performed outside the brazing furnace. The position where the cooling step is performed may be changed in various ways, depending on the type of processing, such as whether the cooling step and the bonding step are performed in a single chamber like the brazing furnace or whether the steps are performed in continuous furnaces.

Further, the method of selectively or partially quenching only the second cooling block 20 may be implemented in various ways.

For example, as shown in FIG. 4, discharging units 300 that discharge cooling water or cooling oil may be disposed around the second jig 200.

By disposing the discharge part or discharging units 300 around the second jig 200, cooling water or cooling oil supplied to the exposed area 20a of the second cooling block 20 can be discharged without directly coming in contact with the first cooling block 10 and the first jig 100.

To this end, flow grooves (not shown), through which cooling water or cooling oil can flow in a specific direction, may be formed on the surface of the second jig 200 and the surfaces of the discharge part or discharging unit 300.

On the other hand, as shown in FIG. 5, a third jig 310 having a cooling channel 311, through which cooling water or cooling oil flows, and covering the exposed area 20a of the second cooling block 20 may be further disposed.

Accordingly, it is possible to cool only the exposed area 20a of the second cooling block 20 by guiding cooling water or cooling oil through the cooling channel 311 formed on the third jig 310. Further, it is possible to guide cooling water or cooling oil without direct contact with the first cooling block 10 and the first jig 100.

Further, in order to selectively quench only the second cooling block 20, it is possible to dispose the first cooling block 10 at an upper position and the second cooling block 20 at a lower position, which is opposite to the arrangement of the first cooling block 10 and the second cooling block 20 shown in FIG. 4. Then cooling water or cooling oil may be sprayed to the exposed area 20a of the second cooling block 20 from under the second cooling block 20. Thus, the cooling water or cooling oil can flow down only by its own weight without coming in contact with the first cooling block 10 even without a separate unit for discharging the cooling water or cooling oil.

The post-heat treatment step is T6 heat treatment (artificial aging heat treatment) and is performed to improve the properties of the first cooling block 10 and the second cooling block 20. The post-heat treatment step heats the first cooling block 10 and the second cooling block 20, which has been forcibly selectively cooled, at a T6 heat treatment temperature (artificial aging heat treatment temperature) and then cools them using air. The T6 heat treatment temperature may be determined on the basis of the material of the first cooling block 10 and the second cooling block 20. For example, since the first cooling block 10 and the second cooling block 20 are made of aluminum or an aluminum alloy having high thermal conductivity, they are heated within the range of 160~220° C. (320~430° F.) and then cooled by air, depending on the components of the materials.

By performing the post-heat treatment, as described above, residual stress generated by exposure of the first cooling block 10 and the second cooling block 20 to a high temperature in welding is removed and the quenched second cooling block 20 is artificially aged.

By selectively or partially quenching only the second cooling block 20 through the step described above, the first cooling block 10 can maintain the state with excellent thermal conductivity like the case with temper of O that is the state in which heat treatment has not been performed in Table 1. Further, the second cooling block 20 can maintain the state with excellent yield strength and tensile strength like the case with temper of T6 that is the state in which heat treatment has been performed.

Although the present disclosure has been described above with reference to the accompanying drawings and embodiments, the present disclosure is not limited thereto, but is instead limited by the following claims. Accordingly, those having ordinary skill in the art may change and modify the present disclosure in various ways without departing from the spirit of the claims.

What is claimed is:

1. A method of manufacturing a cooling block for a battery module, the method comprising:
   a preparing step of preparing a first cooling block configured to be in contact with battery modules on a first side thereof and a second cooling block configured to be bonded to a second side of the first cooling block and forming a cooling channel, through which cooling water can flow, at an interface with the second side of the first cooling block;
   a fixing step of disposing and fixing the second cooling block on the second side of the prepared first cooling block with a jig;
   a bonding step of bonding the fixed first cooling block and second cooling block by heating and welding the first and second cooling blocks; and
   a cooling step of selectively quenching only the second cooling block.

2. The method of claim 1, wherein the preparing step includes preparing an aluminum-based alloy for the first cooling block and the second cooling block, and
   wherein the bonding step includes heating the first cooling block and the second cooling block above a solution treatment temperature of the aluminum-based alloy and then welding the first cooling block and the second cooling block.

3. The method of claim 1, further comprising a post-heat treatment step that includes performing heat treatment by heating the first cooling block and the second cooling block after the cooling step.

4. The method of claim 1, wherein the jig that is used in the fixing step is divided into a first jig and a second jig,
   wherein the first jig supports a side of the first cooling block that is opposite to a side facing the second cooling block of outer sides of the first cooling block,
   wherein the second jig supports a side of the second cooling block that is opposite to a side facing the first cooling block of outer sides of the second cooling block,
   wherein the first jig is prepared in a shape corresponding to the side that is opposite to the side facing the second cooling block of the outer sides of the first cooling block,
   wherein the second jig is prepared in a shape that covers and partially exposes the side that is opposite to the side facing the first cooling block of the outer sides of the second cooling block, and
   wherein the cooling step of selectively quenching only the second block comprises bringing cooling water or cooling oil into contact with an exposed area of the second cooling block that is exposed by the second jig.

5. The method of claim 4, wherein a discharge part discharges the cooling water or cooling oil and is disposed around the second jig in the cooling step.

6. The method of claim 4, wherein a third jig has a second cooling channel, through which cooling water or cooling oil flows, and covers the exposed area of the second cooling block and then only the second cooling block is selectively quenched by guiding cooling water or cooling oil to the second cooling channel.

* * * * *